Jan. 9, 1968  R. B. CORBETT  3,362,219
FORCE MEASURING INSTRUMENTS
Filed May 28, 1965

INVENTOR
Robert B. Corbett

United States Patent Office 3,362,219
Patented Jan. 9, 1968

3,362,219
FORCE MEASURING INSTRUMENTS
Robert B. Corbett, Butler, Pa.
(Ridge Road, R.D. 1, Mars, Pa. 16046)
Filed May 28, 1965, Ser. No. 459,736
4 Claims. (Cl. 73—141)

ABSTRACT OF THE DISCLOSURE

A force measuring instrument having a load bar suspended by a frame. The force is applied to one end of a ram element. The other end of the ram element urges against the load bar causing it to deflect. A rod attached to the ram with a contact point depresses a pivotally suspended lever arm. The lever arm depresses an instrument indicating linear movement whereby the force is read directly as a function of linear movement of the ram.

---

This invention relates to a force measuring instrument and particularly to a load cell for measuring force either under tension or under compression.

There are a number of methods for measuring force. Force may be balanced against a known weight, such as scales, beam balances and pendulum scales. These structures become elaborate and expensive for measuring weight over several thousand pounds. The devices are not portable and generally are cumbersome. Force may be measured by pneumatic or hydraulic structures. These structures require pumps, valves and regulators which are subject to friction and leaks. They are temperature sensitive and cumbersome. Force may be measured by a deformation of elastic bodies such as spring scales and proving rings. Spring scales to be precise must be compensated for temperature changes, aging of material, and frictional problems. Proving rings are acceptable precision instruments, but the rings must be machined to precise contours with integral bosses from specially alloyed steel and then carefully heat treated. Deflection along the diameter of the ring is measured by means of a precision micrometer and a vibrating reed mounted diametrically in the ring. These rings must be used under ideal temperature conditions and shielded from drafts. A couple of degrees change of ambient temperature must be noted and the corresponding force reading corrected by calculation using an appropriate formula. The stress and strain relationship is not linear, and therefore the rings do not provide a direct reading and the individual readings must be converted to pounds by reference to a calibration graph or table. The deformation of the proving ring is different when used in tension when compared to its use in compression, and therefore separate calibration graphs must be prepared for each manner of application.

The present invention is not sensitive to temperature variations and does not require separate calibration curves for measuring compression and tension forces. The present invention is a two-range load cell or force measuring instrument in which two different maximum capacities of load will give maximum deflections per readable division. The invention has a deflection characteristic which is linear whereby the force may be read directly from a dial, an instrument indicating linear deflection. The force measuring instrument can be used to measure forces in compressior or tension.

I provide a force measuring instrument which comprises a load bar, means supporting in suspension the load bar at each end, a ram element having a first point in contact with the load bar, the ram element having a second point to which the force to be measured is applied, and means indicating the deflection of the load bar when the force is applied to the ram, the deflection of the load bar is proportional to the force applied.

I preferably provide a force measuring instrument which comprises a load bar, a frame having a pair of spaced blocks pivotally mounted in the same plane on the frame, the blocks each having openings through which each end of the load bar is engaged permitting the load bar to move within the openings, the bar is rotatable within the blocks through 90° providing a different cross section for different capacities of force measurement, a ram element having a first point in contact with the load bar, a second point to which the measured force in compression or tension is applied, and a bracket extended from the ram having a rotatable cylinder supported within the cylinder having a plurality of projecting points extending in spaced relationship from the ram the distance from the ram being adjustable, means movably supporting the ram within the frame, a lever in contact with one of the projecting points from the cylinder, the lever perpendicular to the ram, means suspending the lever, and an instrument indicating linear deflection having a point in contact with the lever, when force is applied to the ram it deflects the load bar moving it within the spaced blocks, the movement of the ram urges the projecting point of the cylinder against the lever in contact with the instrument contact point, the instrument provides a direct reading of force applied.

I provide a method of measuring force which comprises providing a load element, providing a ram element in contact with the load element, applying the force in compression or tension to be measured to the ram element, and measuring by means indicating linear deflection of the ram which is proportional to the applied force.

Other details, objects and advantages of the invention will become apparent as the following description of a present preferred embodiment and method of practicing the same proceeds.

In the accompanying drawings I have shown and have illustrated a present preferred method of practicing the same in which FIGURE 1 is a side view in longitudinal section taken on the line I—I of FIGURE 3 of the measuring device positioned for compression measurement;

Figure 1:
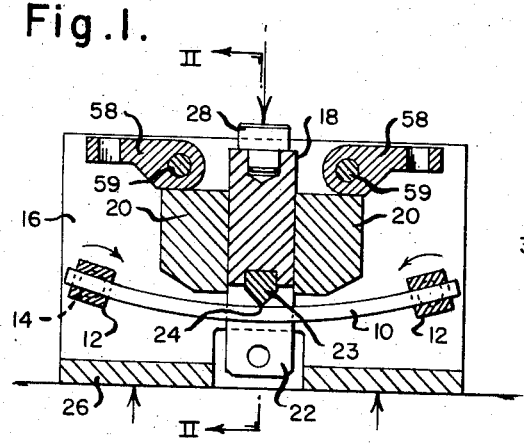
Figure 2:
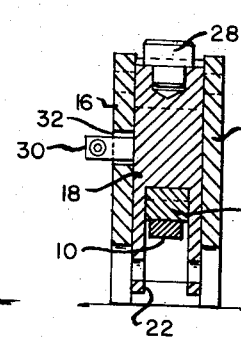
FIGURE 2 is a transverse cross-sectional view on the line II—II of FIGURE 1.
Figure 3:
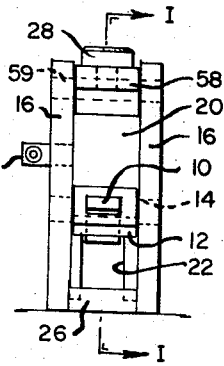
FIGURE 3 is an end elevational view of FIGURE 1 as viewed from the right.

Referring to FIGURES 1, 2 and 3, a load bar 10 is suspended on each end by blocks 12. The blocks 12 have holes through which the ends of load bar 10 are in slidable engagement. The blocks 12 are rotatably mounted through trunnions 14 which are rotatably mounted into the side wall of frame 16. A ram 18 is guided in the frame 16 by guide plates 20. The ram 18 has clevis portions 22 and insert 23 which is a wedge shaped hardened piece of polished steel. The ram 18 contacts load bar 10 at point 24. The frame 16 is supported at the bottom by base 26. A tup 28 is mounted on top of ram 18. A compression force to be measured is applied at tup 28 urging the ram 18 against load bar 10 causing the load bar 10 to deflect. A bracket 30 mounted on ram 18 extends through opening 32 in the side wall of the frame 16.

Figure 5:
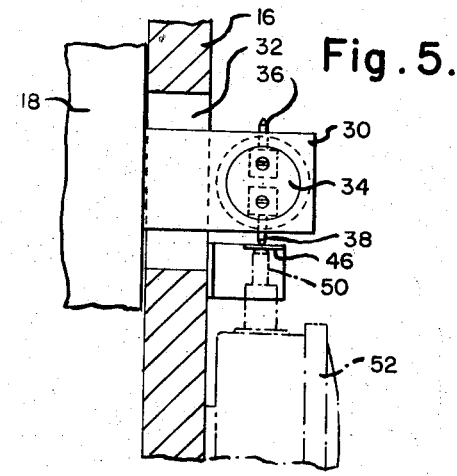
FIGURE 5 is an end elevational view of the force measuring mechanism.
Figure 6:
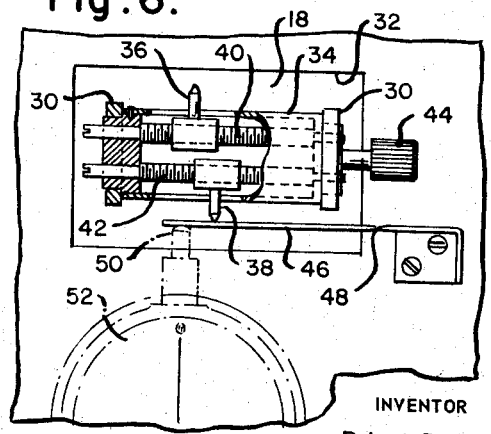
FIGURE 6 is a side elevational view of the mechanism shown in FIGURE 5.

Referring to FIGURES 5 and 6, a cylinder 34 rotatably mounted in bracket 30 has adjustable projections 36 and 38. The projections are laterally adjustable along screws 40 and 42, respectively. The cylinder 34 is rotated manually by a knob 44. Projection 38 engages lever 46 which pivots about pivot point 48. One end of the lever 46 engages dial contact point 50 of dial 52. Whenever ram 18 is urged downwardly, bracket 30 moves with it and projection 38 engages lever 46, thereby providing a pressure against dial contact point 50 whereby the deflection and therefore force can be measured directly by reading the dial 52.

Figure 4:
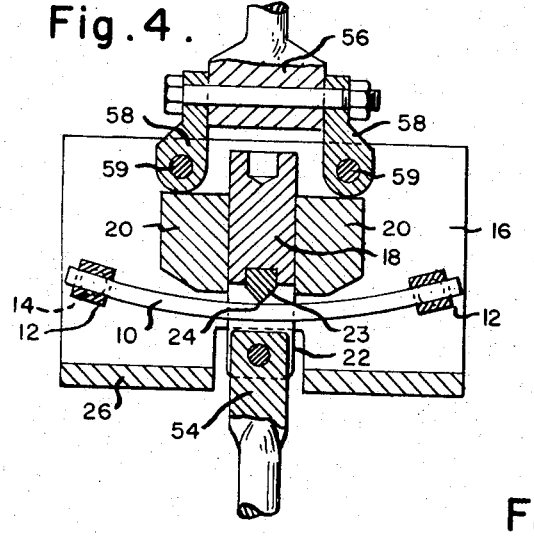
FIGURE 4 is a side view in longitudinal section similar to FIGURE 1 having the measuring device positioned for tension measurement.

Referring to FIGURE 4, the same type arrangement shown in FIGURES 1, 2 and 3 can be used to measure a force in tension. Instead of applying the force above ram 18, an adapter 54 is bolted between clevis portions 22 and the tensile force is applied at adapter 54. The top end of the device is secured to a rigid body or another force in tension by adapter 56 bolted through wing adapters 58 which are pivotally mounted on pins 59 and retractable as shown in FIGURE 1. The load bar 10 is still deflected in the same direction. The ram 18 again moves in the same direction relative to the side frame 16 whereby the same instrument can be used to measure forces in compression or in tension.

The following formula governs the principle of operation:

$$y = \frac{WL^3}{4Ebh^3}$$

$y$ = the vertical deflection at the midpoint. This deflection is directly proportional to the load applied.
$W$ = the weight applied at midpoint.
$b$ = horizontal dimension of the load bar cross section.
$h$ = the vertical dimension of a cross section of the load bar.
$L$ = the distance between the centers of the bearing supports.
$E$ = the modulus of elasticity of the material.

If the load bar 10 is turned or rotated 90° with respect to its supporting blocks 12 so that $b$ (horizontal tension) becomes $h$ (vertical tension), a different load $W$ must then be applied to obtain the same deflection $y$. Using this technique a two-range instrument is provided. The following example applies:

| Deflection, y | Dimension of Beam | | Capacity of Instrument, W, lbs. |
| --- | --- | --- | --- |
| | Horizontal | Vertical | |
| .025 | .86 | .61 | 2,500 |
| .025 | .61 | .86 | 5,000 |

The dimensions of $L$, $b$ and $h$ are calculated so that the deflection $y$ at maximum load is small, for instance, .025 is above for several reasons:

(1) To avoid spring in the load cell and secure what is termed a "hard system."
(2) To minimize rotation of the supports holding the ends of the bar and therefore minimize friction at these points.
(3) To limit the maximum fiber stress in the beam.

The load bar should be of quality tool steel heat treated to a hardness of 45–50 Rockwell C to secure a high yield strength so that the beam when deflected will not suffer a permanent set. E, the modulus of elasticity, should be between 28–30,000,000 p.s.i. for steel which would generally be used for a load bar. However, aluminum having a modulus of 10,000,000 p.s.i. can be used for load bars for high sensitivity and low capacity while molybdenum with an E of 48–50,000,000 could be used for bars of greater capacity.

Projection 36 is used with one portion of the load bar 10 while projection 38 is used with another position. The difference in lengths of points 36 and 38 is equal to one-half the difference between the $b$ and $h$ dimensions of the load bar so that when point 36 is rotated into position, the lever 46 is not deflected and thus the zero setting of the dial indicator 52 is not appreciably changed, and only slight and final adjustment of the zero setting must be made by turning a zero adjustment knob on the dial 52.

While I have shown and described a present preferred embodiment of my invention and have illustrated a present preferred method of practicing the same, it is to be distinctly understood that the invention is not limited thereto but may be otherwise variously embodied within the scope of the following claims.

I claim:
1. A force measuring instrument which comprises:
(1) a load bar;
(2) means supporting in suspension the load bar at each end;
(3) a ram element having:
(a) a first point in contact with the load bar;
(b) a second point to which the measured force is applied; and
(c) a third point extending from the ram element, the third point pointing in the direction of movement of the ram element when a force is applied,
(4) a lever having a pivot point, and a free end and a fixed end at which the lever is supported, the pivot point is between the free end and the fixed end, the third point is in contact with the lever urging against the lever between the pivot point and the free end, the third point is adjustable along the lever for use with different forces;
(5) an instrument having an instrument point in contact with the lever between the free end and the third point, the instrument point urging against the lever in the opposite direction of third point, the instrument indicating linear deflection of the lever, when force is applied to the ram, the ram is urged against the load bar, the movement of the ram urged the third point against the lever in contact with the instrument contact point, the instrument provides a direct reading of force applied.

2. A force measuring instrument which comprises:
(1) a load bar;
(2) means supporting in suspension the load bar at each end;
(3) a ram element having:
(a) a first point in contact with the load bar;
(b) a second point to which the measured force is applied; and
(c) a third point extended from the ram in spaced parallel relationship, the space between the ram and the third point is adjustable for different forces;
(4) a lever in contact with the third point, the lever perpendicular to the ram;
(5) means suspending the lever about a pivot; and
(6) an instrument indicating linear deflection of the lever having a point in contact with the lever, when force is applied to the ram the ram is urged against the load bar, the movement of the ram urges the third point against the lever in contact with the dial contact point, the instrument provides a direct reading of force appplied.

3. A force measuring instrument which comprises:
(1) a load bar;
(2) a frame having a pair of spaced blocks pivotally mounted in the same plane on the frame, the blocks each having openings through which each end of the load bar is engaged permitting the load bar to move within the openings, the bar is rotatable within the blocks through 90° providing a different cross section for force measurement;
(3) a ram element having:
(a) a first point in contact with the load bar;

(b) a second point to which the measured force is applied; and
(c) a bracket extended from the ram having a rotatable cylinder supported within, the cylinder having a plurality of projecting points extending in spaced relationship from the ram, the distance from the ram being adjustable.
(4) means supporting the ram within the frame;
(5) a lever in contact with one of the projecting points from the cylinder, the lever perpendicular to the ram;
(6) means suspending the lever; and
(7) an instrument indicating linear deflection of the lever having a point in contact with the lever, when force is applied to the ram it deflects the load bar moving it within the spaced blocks, the movement of the ram urges the projecting point of the cylinder against the lever in contact with the instrument contact point, the instrument provides a direct reading of force applied.

4. A multiple range force measuring instrument which comprises:
(1) a load bar;
(2) means supporting the load bar and permitting the load bar to rotate 90° providing a different cross section orientation for different force capacities;
(3) a ram element having a first point in contact with the load bar, the ram element having a second point to which the measured force in tension or compression is applied; and
(4) means indicating linear deflection of the load bar whether a compression or tension force is applied, the deflection is proportional to the force applied.

References Cited
UNITED STATES PATENTS

| | | | |
|---|---|---|---|
| 1,361,990 | 12/1920 | Hatcher et al. | 73—141 |
| 2,319,299 | 5/1943 | Converse | 73—141 |

RICHARD C. QUEISSER, *Primary Examiner.*

JAMES J. GILL, *Examiner.*

D. SCHNEIDER, *Assistant Examiner.*

UNITED STATES PATENT OFFICE
CERTIFICATE OF CORRECTION

Patent No. 3,362,219　　　　　　　　　　　　　　January 9, 1968

Robert B. Corbett

It is hereby certified that error appears in the above numbered patent requiring correction and that the said Letters Patent should read as corrected below.

Column 1, line 65, for "compressior" read -- compression --; column 4, line 29, strike out "between the lever urging against the lever"; line 39, for "urged" read -- urges --.

Signed and sealed this 18th day of February 1969.

(SEAL)
Attest:

Edward M. Fletcher, Jr.　　　　　　　　　　　　EDWARD J. BRENNER
Attesting Officer　　　　　　　　　　　　　　　Commissioner of Patents